United States Patent [19]

Martinmaas

[11] Patent Number: 5,138,977
[45] Date of Patent: Aug. 18, 1992

[54] UNUSABLE MILK COLLECTION BUCKET WITH OVERFLOW PREVENTION MEANS

[76] Inventor: Mike Martinmaas, HCR 1 Box 37, Orient, S. Dak. 57467

[21] Appl. No.: 772,576

[22] Filed: Oct. 7, 1991

[51] Int. Cl.$^5$ .............................................. A01J 9/00
[52] U.S. Cl. ............................... 119/14.17; 119/14.46; 137/558; 116/228
[58] Field of Search ............. 119/14.46, 14.17, 14.18, 119/14.14, 14.32, 14.01; 137/247.23, 398, 558; 116/228, 229, 273

[56] References Cited

U.S. PATENT DOCUMENTS

| | | | |
|---|---|---|---|
| 1,139,571 | 5/1915 | Patterson | 119/14.18 |
| 1,534,939 | 4/1925 | Fuge | 119/14.14 |
| 2,006,393 | 7/1935 | Hapgood | 119/14.46 |
| 2,584,425 | 2/1952 | Cox | 116/228 |
| 2,895,447 | 7/1959 | Burrell | 116/228 |
| 3,208,429 | 9/1965 | Woorlander | 119/14.46 |
| 3,322,100 | 5/1967 | Bender | 119/14.46 |
| 3,526,201 | 9/1970 | Larson | 116/228 |
| 4,582,021 | 4/1986 | Herr | 119/14.46 |

FOREIGN PATENT DOCUMENTS 1358856 12/1987 U.S.S.R. .................. 119/14.46

Primary Examiner—Paul J. Hirsch
Assistant Examiner—Todd E. Manahan
Attorney, Agent, or Firm—Hugh E. Smith

[57] ABSTRACT

A strip bucket utilizable in a cow milking operation is provided with a lid having a ball check valve to prevent bad milk from entering a bulk storage container. Additionally, the ball check valve may be provided with integrally attached milk collection tubes which extend orthogonally outwardly therefrom. Additionally, the ball check valve may be provided with an outwardly extending paddle member which operates to raise a signal flag once a strip bucket has been filled with milk.

4 Claims, 4 Drawing Sheets

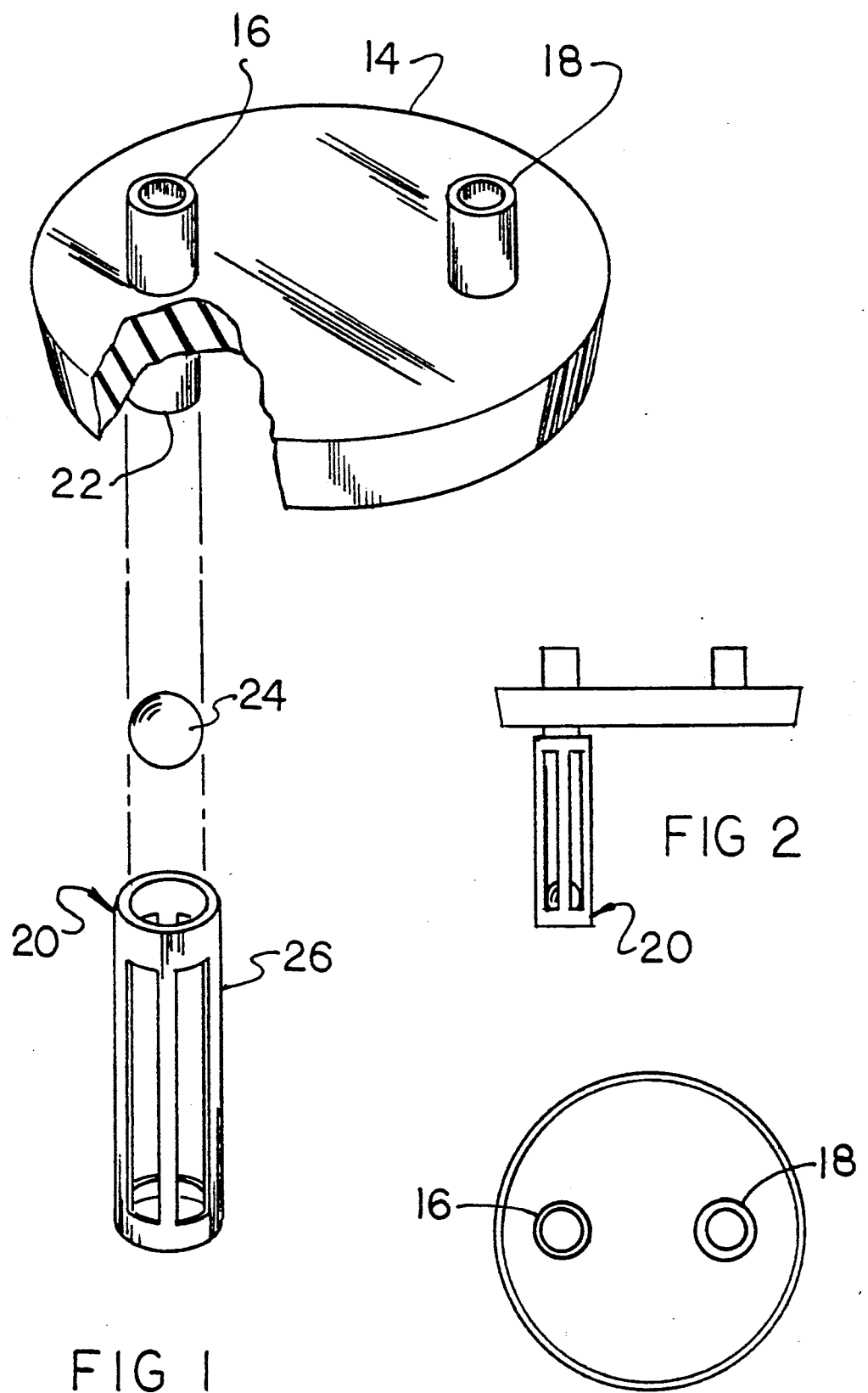

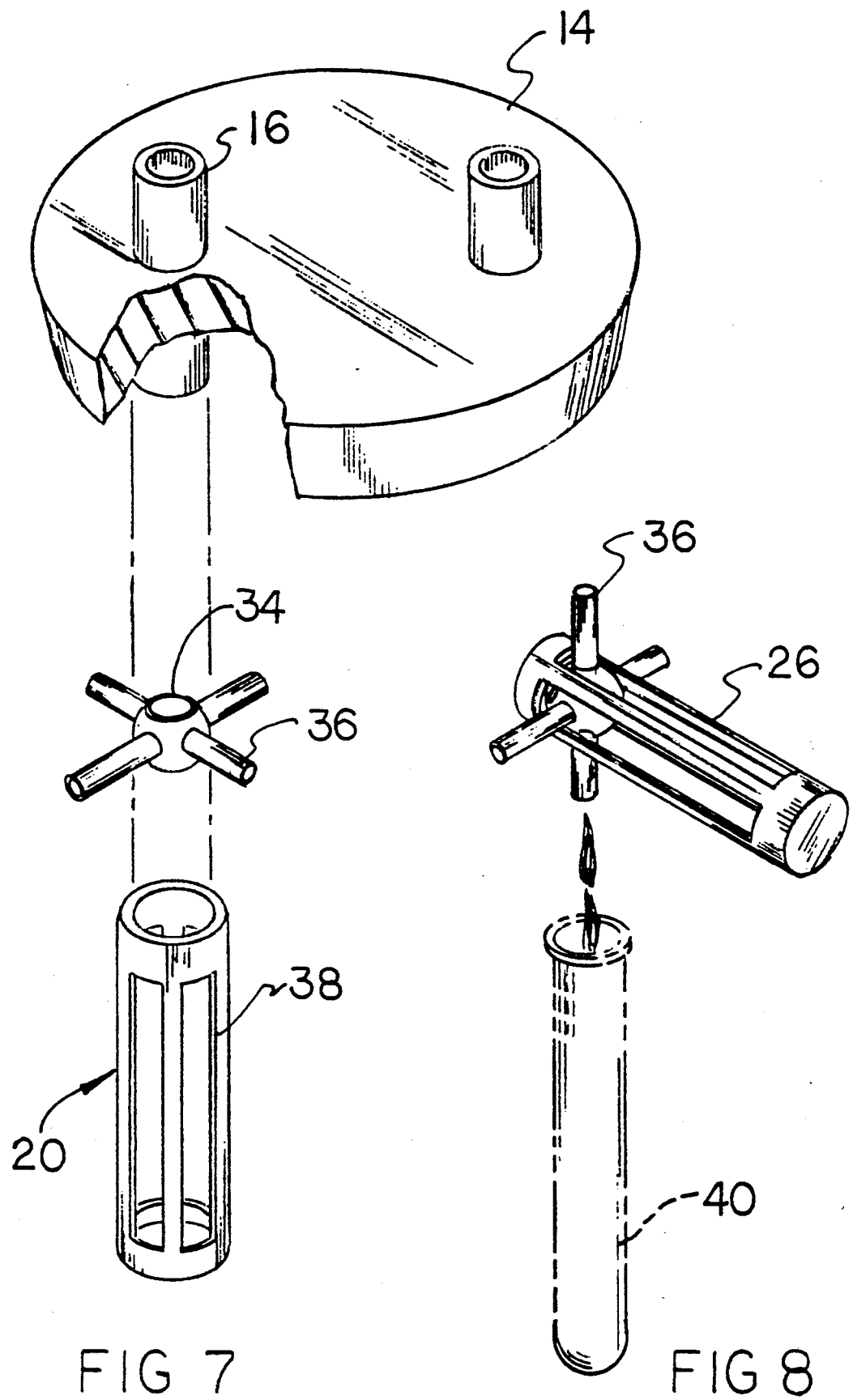

UNUSABLE MILK COLLECTION BUCKET WITH OVERFLOW PREVENTION MEANS

BACKGROUND OF THE INVENTION

1. Field of the Invention

The present invention relates to cow milking devices and more particularly pertains to a strip bucket for collecting bad milk wherein such bucket is provided with an automatic overflow prevention valve arrangement.

2. Description of the Prior Art

The use of strip buckets for collecting bad milk from cows is known in the prior art. In this respect, approximately 5 to 7% of all cows in a milk cow herd have to be strip bucket milked due to the presence of bad milk in their udders (teat). There is always a chance during every milking that a strip bucket could contaminate the bulk tank milk. This has become more of a problem in recent years due to better breeding of cows which has resulted in their providing of more milk. These new breed cows can easily fill a strip bucket and if a strip bucket overflows, bad milk can end up in the bulk milk tank which could result in a ruination of all of the milk. In those situations where a milker is very busy and forgets to unhook a strip bucket, the next cow in the line could overfill the bucket which could again result in ruination of the bulk supply. Also, where the bulk tank milk has been ruined and the dairy man doesn't discover this before the milk is delivered to a tank truck, a real possibility exists that all of the milk in the tank truck could be ruined. As such, there exists a continuing need for some means of preventing bad milk overflow from a strip bucket and in this respect, the present invention substantially fulfills this need.

SUMMARY OF THE INVENTION

In view of the foregoing disadvantages inherent in the known types of strip buckets now present in the prior art, the present invention provides an improved strip bucket construction wherein the same can be utilized to prevent the overflow of bad milk into a bulk storage container. As such, the general purpose of the present invention, which will be described subsequently in greater detail, is to provide a new and improved strip bucket assembly which has all the advantages of the prior art milk strip buckets and none of the disadvantages.

To attain this, the present invention essentially comprises a strip bucket utilizable in a cow milking operation which is provided with a lid having a ball check valve to prevent bad milk from entering a bulk storage container. Additionally, the ball check valve may be provided with integrally attached milk collection tubes which extend orthogonally outwardly therefrom. Additionally, a ball check valve may be provided with an outwardly extending paddle member which operates to raise a signal flag once a strip bucket has been filled with milk.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved strip bucket assembly which has all the advantages of the prior art strip bucket assemblies and none of the disadvantages.

It is another object of the present invention to provide a new and improved strip bucket assembly which may be easily and efficiently manufactured and marketed.

It is a further object of the present invention to provide a new and improved strip bucket assembly which is of a durable and reliable construction.

An even further object of the present invention is to provide a new and improved strip bucket assembly which is susceptible of a low cost of manufacture with regard to both materials and labor, and which accordingly is then susceptible of low prices of sale to the consuming public, thereby making such strip bucket assemblies economically available to the buying public.

Still yet another object of the present invention is to provide a new and improved strip bucket assembly which provides in the apparatuses and methods of the prior art some of the advantages thereof, while simultaneously overcoming some of the disadvantages normally associated therewith.

Still another object of the present invention is to provide a new and improved strip bucket assembly which prevents the overflow of bad milk therefrom.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an exploded perspective view of the cap assembly forming a part of the present invention.

FIG. 2 is a side elevation view thereof.

FIG. 3 is a top plan view thereof.

FIG. 7 is an exploded view of a modified cap assembly for use with the present invention.

FIG. 8 is a perspective view illustrating a use of the modified ball check valve forming a part of the second embodiment of the invention.

DESCRIPTION OF THE PREFERRED EMBODIMENTS

Figures 4, 5:
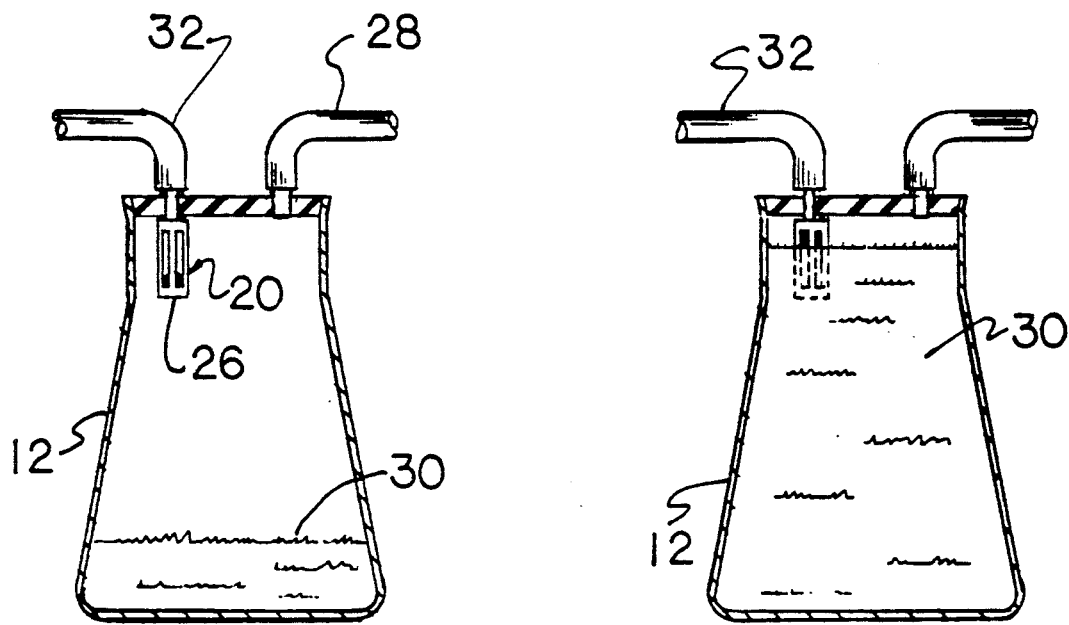
FIG. 4 is a cross-sectional side elevation view of the invention wherein the strip bucket is only partially full of bad milk.
FIG. 5 is a cross-sectional side elevation view of the invention wherein the strip bucket is filled with bad milk.

With reference now to the drawings, and in particular to FIGS. 1-6 thereof, a new and improved strip bucket assembly embodying the principles and concepts of the present invention and generally designated by the reference numeral 10 will be described.

The strip bucket assembly 10 essentially consists of a strip bucket 12 having a removable closure 14 affixed to a top portion thereof. The closure 14 may be designed to threadably attach to the top of the strip bucket 12; however, in the preferred embodiment, only a frictional fit is envisioned so as to permit the use of conventional strip buckets now commercially available.

The closure 14 is provided with a pair of through-extending conduits 16, 18, and a ball check valve assembly 20 is designed to be secured to an interior end 22 of the conduit 16 whereby the ball check valve assembly extends downwardly into the strip bucket 12. The interior end 22 of the conduit 16 serves as a valve seat which can be selectively opened and closed by a floating ball 24 retained within a ball cage 26. The ball cage 26 and the floating ball 24 essentially comprise the ball check valve assembly 20.

Figure 6:
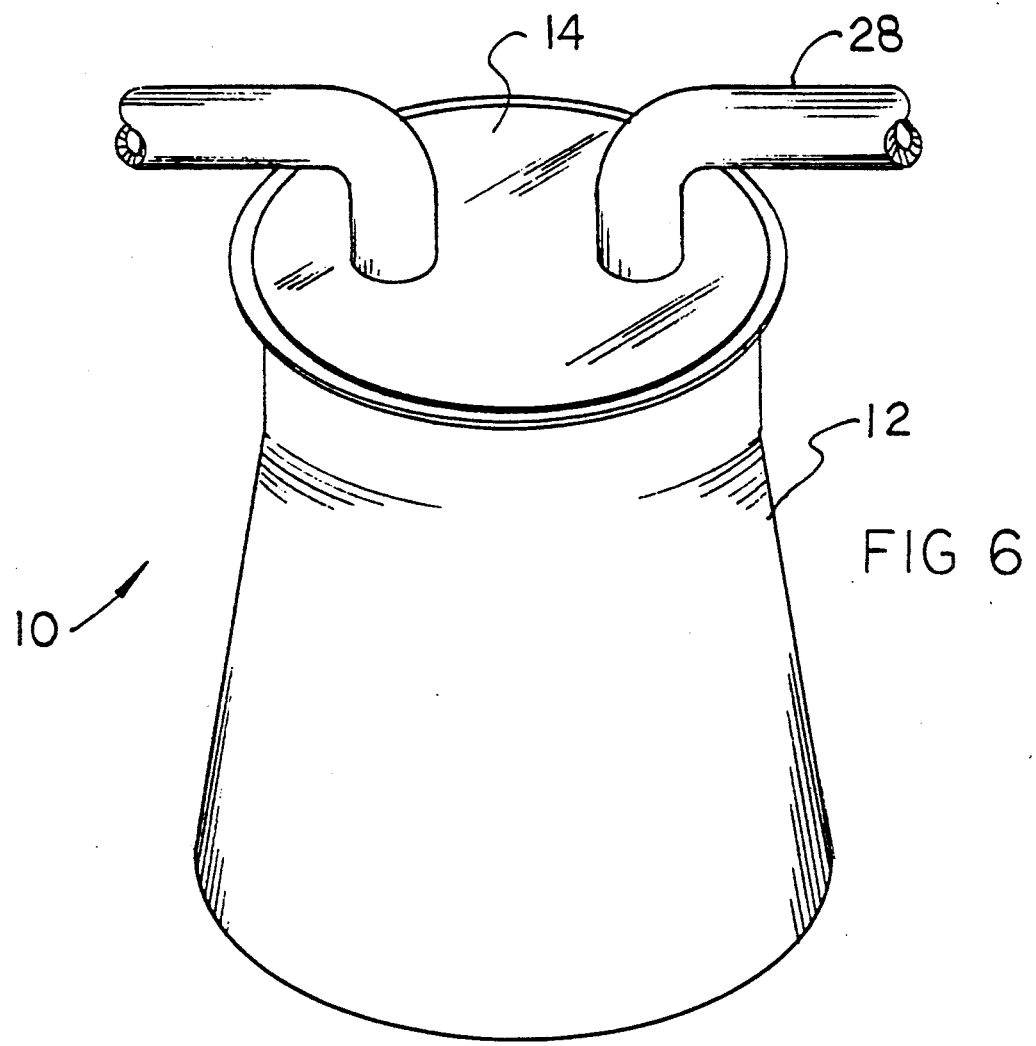
FIG. 6 is a perspective view of the complete strip bucket assembly.

With particular reference to FIGS. 4-6, the manner of operation of the strip bucket assembly will be described. In this respect, a flexible milking tube 28 is attached to the conduit 18 and serves as the supply line for bad milk being stripped from a cow. The milk is generally designated by the reference numeral 30 and is collected within the strip bucket 12 in a now apparent manner. A second flexible tube 32 is attached to the conduit 16 and serves as the normal overflow line whereby the milk is directed from the strip bucket 12 to a bulk milk container. As shown in FIG. 4, when the milk supply 30 is below the bottom level of the valve ball check valve assembly 20, the check valve ball 24 will be retained in a bottom portion of the cage 26, whereby air may be ejected outwardly through the tube 32 as additional milk is supplied to the strip bucket 12 through the tube 28. When the milk supply 30 reaches the top of the strip bucket 12 as shown in FIG. 5, the ball check 24 moves to a top end portion of the cage 26, thereby to effectively prevent any flow of air or milk through the tube 32, thus to prevent the overflow of bad milk to the aforementioned bulk milk container. At this point in time, a milker knows to remove the strip bucket 12 and discard the bad milk 30 therefrom.

FIGS. 7 and 8 of the drawings illustrate a modified embodiment of the ball check valve assembly 20. More particularly, a modified floating check valve ball 34 is provided with a plurality outwardly extending tubes, all of which are generally designated by the reference numeral 36, wherein such tubes extend outwardly through a plurality of slots 38 formed in the cage 26. Each of the tubes 36 are hollow and tend to capture small amounts of milk 30 once the milk comes into engagement with the check ball 34. The closure 14 can then be removed from the strip bucket 12, and the ball check valve assembly 20 can be removed from the conduit 16 whereby one or more of the tubes 36 can be inverted to collect milk in a remote container 40. This facilitates an easy means of collecting milk 30 from the strip bucket 12 for the purposes of determining the quality of the milk.

Figures 9, 10:
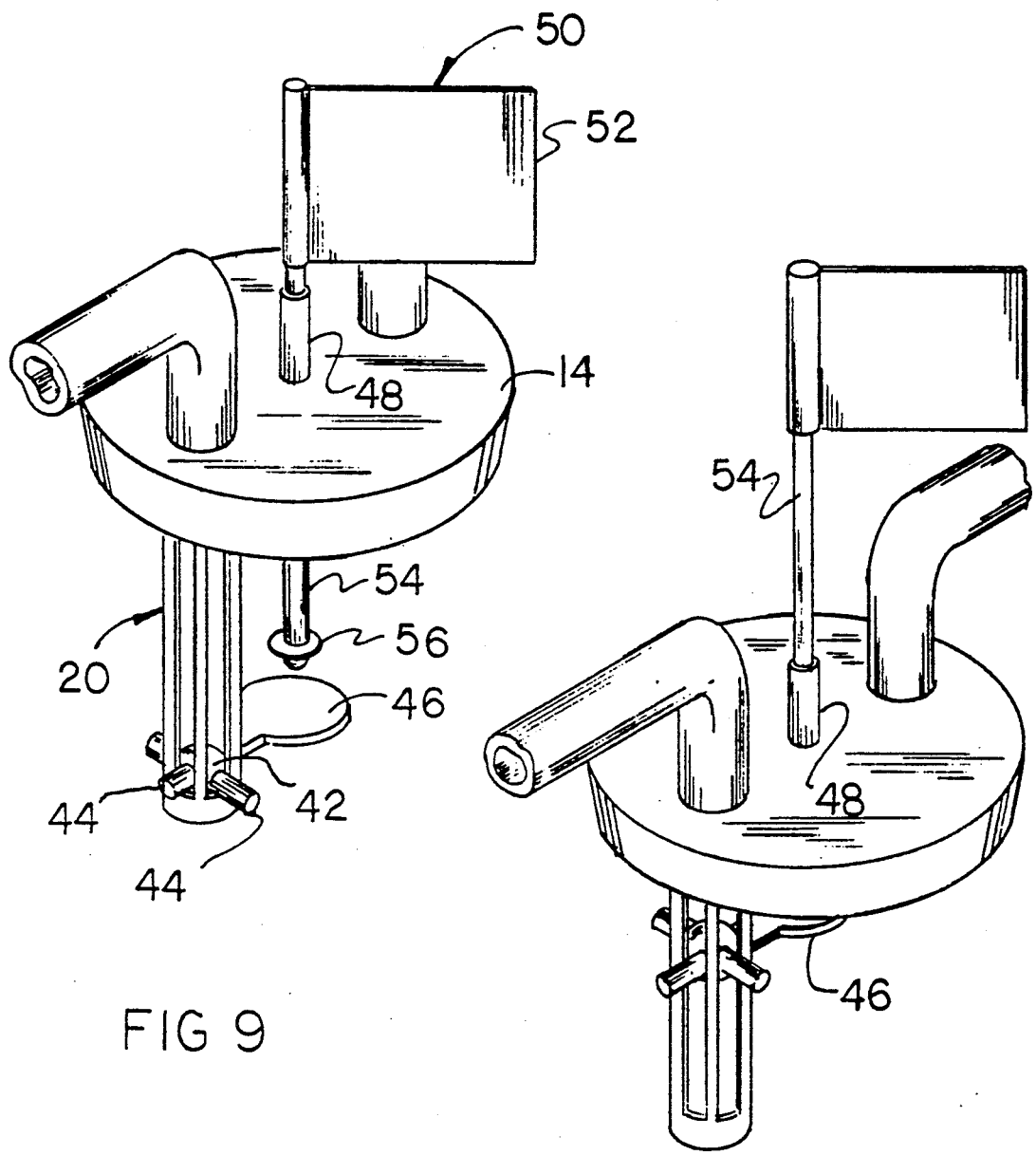
FIG. 9 is a perspective view of a further embodiment of the cap assembly utilizable with the present invention.
FIG. 10 is a perspective view of the third embodiment of the invention wherein a signal flag is now positioned in a raised condition.

Another version of ball check valve assembly 20 can be found in FIGS. 9 and 10 wherein a floating check ball 42 is provided with three outwardly extending arms 44 and one outwardly extending paddle member 46, with these four outwardly extending appendages being aligned in the afore-described slots 38 formed in the cage 26. A further conduit 48 is centrally positioned within the closure 14 and extends therethrough. A signal flag assembly 50 includes a flag member 52 attached to a rod 54 which is slidably positionable within the conduit 48. The weight of the signal flag assembly 50 normally holds it downwardly in a lowered position as indicated in FIG. 9. However, as milk 30 rises in the strip bucket 12, the float ball 42 will rise so as to cause the paddle member 46 to come into abutment with a bottom end portion 56 of the flag assembly 50. As the ball 42 continues to rise, the paddle member 46 will force the rod 54 upwardly through the conduit 48 so as to effectively cause the flag assembly 50 to rise, thereby indicating to a milker that the strip bucket 12 is full of milk.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved strip bucket assembly for collecting bad milk from a cow and preventing an overflow of such bad milk from said strip bucket assembly, said assembly comprising:

a strip bucket;

closure means attachable to a top portion of said strip bucket;

inflow means consisting of a supply line for delivering bad milk from a cow, said inflow means being directed through said closure means;

outflow means consisting of a delivery line for facilitating an outward flow of trapped air from said strip bucket, said delivery line being directed through said closure means and being connected to a bulk tank storage means; and check valve means attached to said outflow means for preventing an overflow of said bad milk from said strip bucket to said delivery line, said check valve means comprising a ball check valve assembly which includes a floating ball captured within a ball cage, said floating ball floating on said bad milk and effecting a closure of said outflow means when said bad milk rises to a near top portion of said strip bucket, said floating ball further including at least one outwardly extending member positioned through a longitudinal slot formed in said ball cage.

2. The new and improved strip bucket assembly as described in claim 1, wherein said at least one outwardly extending member is of a tubular construction and operates to collect milk samples when said floating ball comes into contact with said bad milk.

3. The new and improved strip bucket assembly as described in claim 1, and further including flag signal means attached to said closure means, wherein said flag signal means operates to indicate when said strip bucket is substantially full of bad milk.

4. The new and improves strip bucket assembly as described in claim 3, and wherein an outwardly extending paddle member is attached to said floating ball, said paddle member being engagable with a flag forming a part of said flag signal means, said paddle member forcing said flag upwardly as said floating ball rises in response to a filling of said strip bucket with said bad milk.

* * * * *